United States Patent [19]
Janicke

[11] 4,121,080
[45] Oct. 17, 1978

[54] WIRE ELECTRODE VIBRATION DAMPER

[75] Inventor: Johann Janicke, Haute-Savoie, France

[73] Assignee: Ateliers des Charmilles, S.A., Geneva, Switzerland

[21] Appl. No.: 699,355

[22] Filed: Jun. 24, 1976

[30] Foreign Application Priority Data

Jul. 7, 1975 [CH] Switzerland ............ 8825/75

[51] Int. Cl.² ............................................. B23P 1/08
[52] U.S. Cl. ............................. 219/69 W; 83/651.1; 226/196
[58] Field of Search ............... 219/69 W, 69 V, 69 E, 219/10.61; 83/651.1, 171; 313/269; 204/206, 224 M; 140/147, 2; 226/196, 199, 200; 188/266, 1 B; 174/42

[56] References Cited
U.S. PATENT DOCUMENTS

| 3,495,258 | 2/1970 | Kholodnov et al. | 219/69 W |
| 3,849,624 | 11/1974 | Dulebohn et al. | 219/69 W |
| 4,016,395 | 4/1977 | Rietveld | 219/69 W |

*Primary Examiner*—Bruce A. Reynolds
*Attorney, Agent, or Firm*—Hauke and Patalidis

[57] ABSTRACT

A support and guiding arrangement for a wire electrode for electro-erosion machining apparatus comprising at least a bearing surface for the wire electrode disposed between the wire guides for damping the vibrations or oscillations of the wire unsupported length in the course of a single oscillation, thus preventing resonant oscillations of the wire electrode.

16 Claims, 7 Drawing Figures

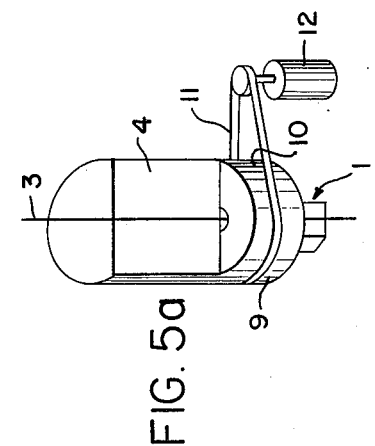
FIG. 5a
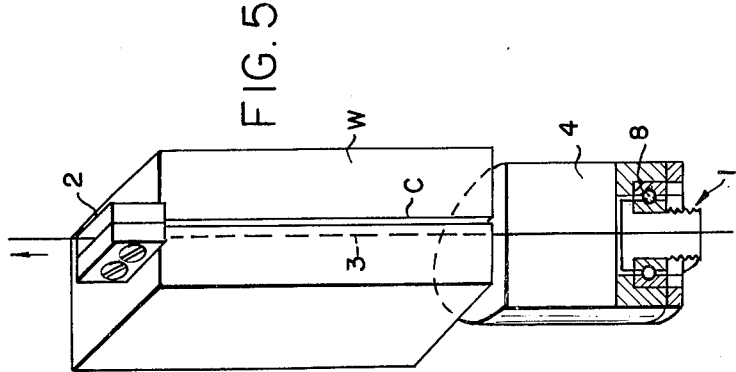
FIG. 5
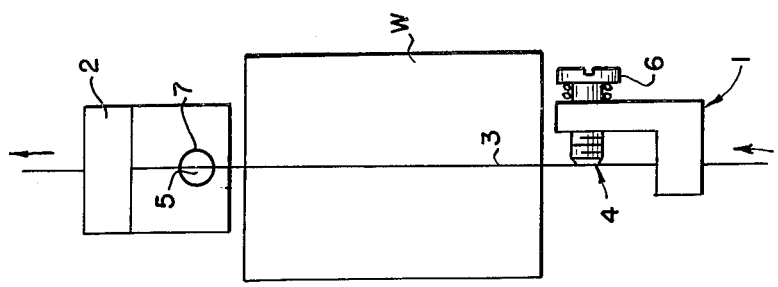
FIG. 4
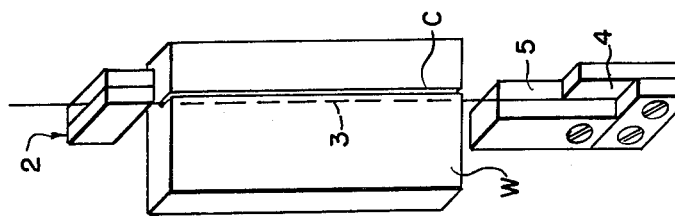
FIG. 3
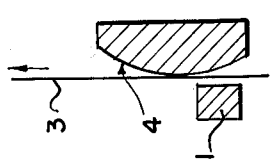
FIG. 6
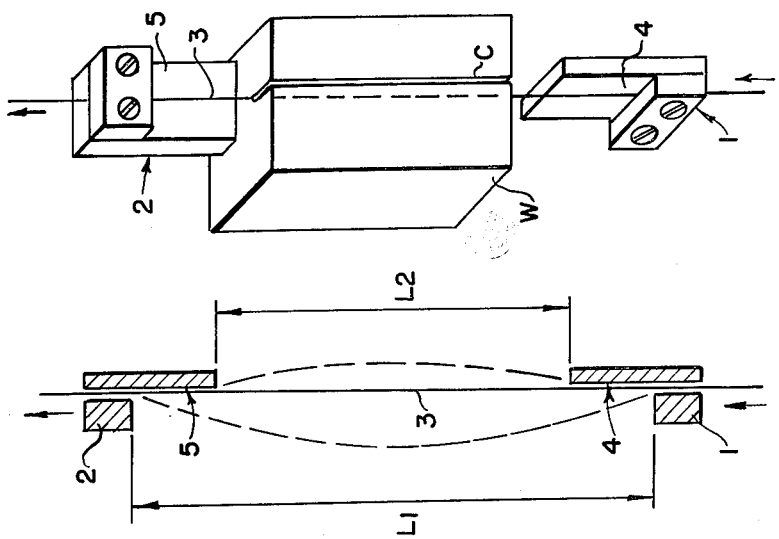
FIG. 2
FIG. 1

WIRE ELECTRODE VIBRATION DAMPER

BACKGROUND OF THE INVENTION

Electro-erosion machining apparatus, such as EDM machines, are often provided with a wire electrode in the form of a metallic wire fed between a pair of support and guiding members. The electrode wire is fed longitudinally in a predetermined direction and has a given free or unsupported length stretched between the support and guiding members. The wire axis and the workpiece are displaced relative to each other so as to effectuate a machining or cutting operation in the workpiece by electroerosion, while maintaining a predetermined machining gap between the wire and the workpiece surface in the course of a cut. In conventional devies of this type, transverse oscillations of the wire may take place in the machining zone at the unsupported portion of the wire between the pair of support and guiding members. This is due to the fact that any elastic stretched wire has a particular resonant fundamental frequency, and several harmonics, the resonant fundamental frequency being inversely proportional to the length of the wire between supports. In any wire electrode EDM machine, the wire oscillations may be caused by mechanical vibrations of diverse origins such as due, for example, to the pulse characteristics of the machining current or to the non-continuous motion of the workpiece being incrementally fed relative to the wire electrode.

As soon as the wire electrode oscillates or vibrates transversely, the machining quality rapidly deteriorates, and the machined surface may even be slightly bulged instead of being straight. In addition, the wire electrode oscillations causes undesirable short circuits to occur between the wire and the workpiece, thus resulting in a considerable decrease of machining efficiency.

SUMMARY OF THE INVENTION

The present invention has for principal object to prevent vibration of the active portion of an EDM wire electrode extending between its support and guide members. The present invention provides a particular arrangement for supporting and guiding a wire electrode which is adaptable to conventional wire electrode support and guiding members. The present invention accomplishes its object by providing at least one bearing surface disposed between the normal wire electrode support and guiding elements such that the free unsupported length of the wire is caused to vary as a function of the direction of its transverse oscillation.

BRIEF DESCRIPTION OF THE DRAWING

The accompanying drawing represents, in a schematic manner and by way of example, several forms of structure of an arrangement according to the present invention. In the drawing: FIG. 1 illustrates the principle of operation of the present invention;

FIG. 2 through 5a illustrate specific arrangements according to the present invention; and FIG. 6 is a partial view similar to FIG. 1, but showing a modification of the present invention.

DETAILED DESCRIPTION OF THE PREFERRED EMBODIMENTS

As schematically shown at FIG. 1, a pair of spaced apart support and guiding members 1 and 2 are provided for a wire electrode 3 being longitudinally fed in the direction of the arrow. The free unsupported length of the wire 3, between the support and guiding members 1 and 2, is represented by length $L_1$. In accordance with the present invention, a plane bearing surface is provided opposite each of the support and guiding members 1 and 2, as shown at 4 and 5, respectively, the bearing surfaces 4 and 5 being disposed in a single plane parallel to the axis of the wire 3. The wire 3 slides along the length of the bearing surfaces 4 and 5 without friction, for all practical purposes, as long as the wire 3 is held rigidly without vibration. However, as soon as the wire 3 is subjected to transverse oscillations in the plane of the drawing, the free oscillating length of the wire is caused to pass from the length $L_1$ to a shorter length $L_2$ in the course of a single excursion or period. Consequently, in the course of each oscillation period some energy is lost as a result of the wire 3 engaging the bearing surfaces 4 and 5, thus causing a rapid damping of the oscillations. In addition, it the free lengths $L_1$ and $L_2$ of the wire 3 are arbitrarily chosen such that they cannot be divided by a common divider, there is no possibility for a particular frequency to be established in a resonant manner in the form of standing waves.

In the arrangement illustrated at FIG. 2, the two plane bearing surfaces 4 and 5 are disposed at right angles to each other and are substantially aligned respectively with the wire support and guiding members 1 and 2, when the wire 3 is caused to effectuate a cut C in a workpiece W. The lengths of the bearing surfaces 4 and 5 are different, such that the free oscillating length of the wire 3 varies for any transverse oscillation in any direction.

In the arrangement of FIG. 3, the bearing surfaces 4 and 5, disposed in perpendicular planes, are staggered in alignment with a single wire support and guiding member, such as support and guiding member 1. The bearing lengths of the surfaces 4 and 5 are different such that the free oscillating length of the wire 3 is caused to vary as a function of the orientation of the plane of oscillation.

The arrangement schematically illustrated at FIG. 4 comprises a pair of adjusting screws 6 and 7 each having an end defining the bearing surface 4 and 5, respectively. Such an arrangement permits to adjust with precision the distances between the screw ends, defining the bearing surfaces, and the wire 3.

The arrangement of FIG. 5 comprises a single plane bearing surface 4 which pivots about the axis of the wire 3 by being supported by means of an appropriate bearing, such as ball bearing 8, disposed concentrically to the wire support and guiding means 1. The bearing surface 4 is rotated by appropriate driving means, such as, for example and as shown at FIG. 5a, forming the bearing surface 4 on a block having a cylindrical end portion 9 provided with a peripheral groove 10 in which is disposed a V-belt 11 driven by an electric motor 12. The frequency of rotation of the bearing surface 4 is chosen such as to be different from the resonant frequency of the wire 3, with the result that any transverse oscillation of the wire 3 is immediately temporarily limited and damped in any direction.

It will be appreciated that, as shown at FIG. 6, the bearing surface 4 or 5 may also be made curvilinear rather than plane, the wire 3 being disposed tangent to the curved bearing surface and such that the free length of the wire, during oscillation, is varied according to a predetermined or constant function of the amplitude of the transverse motion of the wire relative to the bearing surface.

Having thus described the present invention by way of examples of embodiments thereof, given for illustrative purposes only, modifications whereof will be readily apparent to those skilled in the art, what is claimed as new is as follows:

1. In a support and guiding means for a wire electrode in an electro-erosion machining apparatus wherein said wire electrode is fed into a machining zone between a pair of support and guiding members permitting longitudinal displacement of said wire electrode in a predetermined direction, said wire electrode having an unsupported portion of a given length, the improvement for damping transverse oscillations of the unsupported length of said wire electrode comprising a pair of bearing surfaces disposed between the support and guiding members for providing a variation of the unsupported length of said wire electrode as a function of the direction of transverse oscillation of said wire electrode, each of said bearing surfaces being disposed parallel to the axis of said wire electrode, said bearing surfaces being of different lengths and disposed at an angle to each other proximate one of said support and guiding means.

2. The improvement of claim 1 wherein the length of at least one of said bearing surfaces is such that the unsupported length of said wire electrode while tending to oscillate in a direction and the unsupported length of said wire electrode while tending to oscillate in a direction opposite to said first direction do not have a common divider.

3. The improvement of claim 1 wherein at least one of said bearing surfaces is a plane surface, said wire electrode sliding on said plane surface in the course of its longitudinal displacement.

4. The improvement of claim 1 wherein at least one of said bearing surfaces is curved and disposed tangential to said wire electrode such that the unsupported length of said wire electrode varies as a constant function of the amplitude of its transverse displacement relative to said surface.

5. In a support and guiding means for a wire electrode in an electro-erosion machining apparatus wherein said wire electrode is fed into a machining zone between a pair of support and guiding members permitting longitudinal displacement of said wire electrode in a predetermined direction, said wire electrode having an unsupported portion of a given length, the improvement for damping transverse oscillations of the unsupported length of said wire electrode comprising a pair of bearing surfaces disposed between the support and guiding members for providing a variation of the unsupported length of said wire electrode as a function of the direction of transverse oscillation of said wire electrode, each of said bearing surfaces being disposed parallel to the axis of said wire electrode, said bearing surfaces being disposed at a right angle to each other and being aligned respectively with the first and the second support and guiding members.

6. The improvement of claim 5 wherein the length of at least one of said bearing surfaces is such that the unsupported length of said wire electrode while tending to oscillate in a direction and the unsupported length of said wire electrode while tending to oscillate in a direction opposite to said first direction do not have a common divider.

7. The improvement of claim 5 wherein at least one of said bearing surfaces is a plane surface, said wire electrode sliding on said plane surface in the course of its longitudinal displacement.

8. The improvement of claim 5 wherein at least one of said bearing surfaces is curved and disposed tangential to said wire electrode such that the unsupported length of said wire electrode varies as a constant function of the amplitude of its transverse displacement relative to said surface.

9. In a support and guiding means for a wire electrode in an electro-erosion machining apparatus wherein said wire electrode is fed into a machining zone between a pair of support and guiding members permitting longitudinal displacement of said wire electrode in a predetermined direction, said wire electrode having an unsupported portion of a given length, the improvement for damping transverse oscillations of the unsupported length of said wire electrode comprising a pair of bearing surfaces disposed between the support and guiding members for providing a variation of the unsupported length of said wire electrode as a function of the direction of transverse oscillation of said wire electrode, wherein said bearing surfaces are of different lengths and disposed parallel to the axis of said wire electrode at a right angle to each other, each being in alignment with one of said support and guiding members.

10. The improvement of claim 9 wherein the length of at least one of said bearing surfaces is such that the unsupported length of said wire electrode while tending to oscillate in a direction and the unsupported length of said wire electrode while tending to oscillate in a direction opposite to said first direction do not have a common divider.

11. The improvement of claim 9 wherein at least one of said bearing surfaces is a plane surface, said wire electrode sliding on said plane surface in the course of its longitudinal displacement.

12. The improvement of claim 9 wherein at least one of said bearing surfaces is curved and disposed tangential to said wire electrode such that the unsupported length of said wire electrode varies as a constant function of the amplitude of its transverse displacement relative to said surface.

13. In a support and guiding means for a wire electrode in an electro-erosion machining apparatus wherein said wire electrode is fed into a machining zone between a pair of support and guiding members permitting longitudinal displacement of said wire electrode in a predetermined direction, said wire electrode having an unsupported portion of a given length, the improvement for damping transverse oscillations of the unsupported length of said wire electrode comprising at least one bearing surface disposed between the support and guiding members for providing a variation of the unsupported length of said wire electrode as a function of the direction of transverse oscillation of said wire electrode, wherein said bearing surface is rotatable about the axis of said wire electrode, the frequency of rotation of said bearing surface being different from the resonant frequency of the unsupported portion of said wire electrode.

14. The improvement of claim 13 wherein the length of said bearing surface is such that the unsupported length of said wire electrode while tending to oscillate in a direction and the unsupported length of said wire electrode while tending to oscillate in a direction opposite to said first direction do not have a common divider.

15. The improvement of claim 13 wherein said bearing surface is a plane surface disposed parallel to the axis of said wire electrode, said wire electrode sliding on said plane surface in the course of its longitudinal displacement.

16. The improvement of claim 13 wherein said bearing surface is curved and disposed tangential to said wire such that the unsupported length of said wire varies as a constant function of the amplitude of its transverse displacement relative to said surface.

* * * * *